Aug. 4, 1964 W. STELZER 3,143,125
BRAKE PRESSURE PROPORTIONING DEVICE
Filed Dec. 18, 1961 2 Sheets-Sheet 1

INVENTOR.
William Stelzer
BY
Harness, Dickey & Pierce.
ATTORNEYS.

INVENTOR.
William Stelzer

United States Patent Office 3,143,125
Patented Aug. 4, 1964

3,143,125
BRAKE PRESSURE PROPORTIONING DEVICE
William Stelzer, Bloomfield Hills, Mich. assignor to Kelsey-Hayes Company, Romulus, Mich., a corporation of Delaware
Filed Dec. 18, 1961, Ser. No. 159,988
9 Claims. (Cl. 137—38)

This invention relates to hydraulic brake systems for vehicles and particularly to a device for varying the proportion of brake pressure delivered to the front and rear brakes of a vehicle in accordance with the change in weight distribution between front and rear wheels produced by rapid deceleration of the vehicle.

It is well known that the effective braking effort of which a vehicle wheel is capable is dependent upon the weight carried by that particular wheel. In front engine passenger cars, the greater proportion of weight is borne by the front wheels and, for this reason, the pistons of the front wheel brake cylinders in the hydraulic brake system are normally made somewhat larger than the pistons of the rear wheel brake cylinders. By this means, pressure delivered to the brake cylinders from a common master cylinder will produce a greater braking force on the shoes of the front brakes than is applied to the shoes of the rear brakes. However, it is well known that the proportion of the vehicle's weight that is borne by the wheels of a given axle or a given pair of wheels does not remain static. As the vehicle is braked, a couple is developed about the center of gravity of the car, which results in a percentage of the weight of the car borne by the rear wheels being transferred to the front wheels. The amount of the weight transfer for a given vehicle is dependent upon the magnitude of the deceleration. In recognition of this fact, various devices have heretofore been proposed which are responsive to deceleration and which serve to limit the brake pressure applied to the rear wheels upon the attainment of a predetermined rate of deceleration. The apparent object of such devices is to permit the greatest application of braking pressure to the front wheels before skidding will result at the rear wheels. As is well known, premature rear wheel skidding substantially reduces the coefficient of friction between the rear wheels and the ground and also causes loss of control of the vehicle. It is, therefore, desirable that the force exerted on the front and rear brakes should be proportioned according to the maximum braking effort of which the front and rear wheels are capable.

The change in weight borne by the front and rear wheels of the vehicle may be graphically plotted as a function of deceleration and the ideal distribution of braking force to the front and rear wheels will be established by the resultant curve. In an ideal brake system, the proportion of brake force applied to the front and rear wheels should be varied to approximate this curve as closely as possible. While it may be assumed that it is not feasible to proportion the braking pressure in a mathematically exact duplication of the ideal curve in a system of commercially reasonable cost, devices heretofore produced have produced marked undesirable deviations from the ideal curve. Accordingly, it is an object of the present invention to provide a brake proportioning device which is operable to proportion the braking force of the front and rear wheels of a vehicle in a manner closely approximating the ideal distribution of braking force as determined by the deceleration of the vehicle.

It is another object of the present invention to provide a device of the above character which is reliable in operation, which is inexpensive of manufacture and ruggedly constructed.

It is another object of the present invention to provide a brake pressure proportioning device for limiting the brake pressure delivered to the rear wheels in a manner closely approximating the transfer of weight from the rear to the front wheels of the vehicle with which the device is used.

It is still another object of the present invention to provide a device of the above character which may be readily inserted in the hydraulic brake system of a passenger car without requiring other changes in the brake system.

It is another object of the present invention to provide a device of the above character which is relatively smooth in operation and results in relatively gradual changes in brake pressure.

These and other objects of the present invention will become apparent from the following detailed description taken in conjunction with the accompanying drawings wherein.

Figure 1:
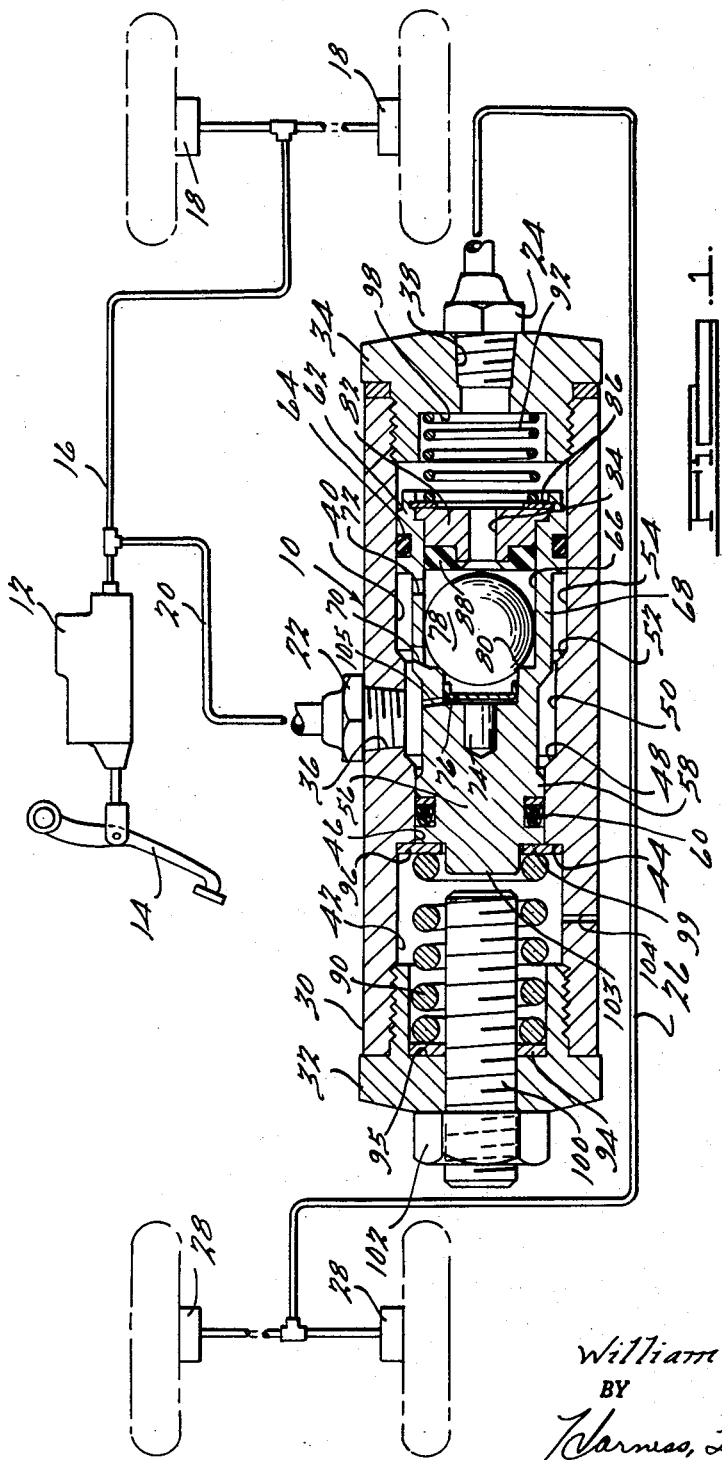
FIGURE 1 is an axial sectional view through the proportioning device showing its manner of connection in a diagrammatically illustrated brake system.

FIGURE 1 illustrates the proportioning device of the present invention at 10 and also shows its manner of connection in a hydraulic brake system for a passenger car or the like. The usual master cylinder is shown at 12 as being operated by a brake pedal 14 to deliver brake fluid directly through a conduit 16 to the front wheel brake cylinders 18. Fluid pressure is also delivered from the conduit 16 through conduits 20 and 26 to the rear wheel brake cylinders 28. The proportioning device is interposed in the fluid connection to the rear brakes as between the conduits 20 and 26 by means of fittings 22 and 24. Thus, fluid pressure can only be transmitted to the rear brakes by a passage through the proportioning device.

The proportioning device of FIGURE 1 includes a hollow housing or cylinder 30 which is closed at one end by an end closure member 32 and at its other end by an end closure member 34. The housing has an inlet opening 36 in the wall thereof into which the fitting 22 is threaded, while the end member 34 is provided with an outlet opening 38 into which the fitting 24 is threaded. The housing 30 has a central bore or chamber 40 which provides communication between the inlet and outlet openings. The bore 40 is symmetrical about its longitudinal axis and is of stepped diameter to provide axially successive bore portions of varying cross sectional area with shoulders formed intermediate said bore portions. These bore portions and shoulders include a bore portion 42, an annular radial shoulder 44, a bore portion 46, an inclined shoulder 48, a bore portion 50, an inclined shoulder 52 and a bore portion 54. A piston 56 is carried within the bore 40 for axial reciprocatory movement and is provided with an enlarged portion 58 at the left-hand end thereof having a seal 60 sealingly engaging the wall of the bore portion 46. Similarly, the enlarged bore portion 62 at the right-hand end of the piston is provided with a seal or O-ring 64 sealingly engaging the wall of the bore portion 54. The end of the piston adjacent the outlet opening 38 has a cavity 66 which is defined by a relatively thin annular wall 68. The wall 68 is provided with first and second sets of circumferentially arranged openings 70 and 72, respectively, which permit fluid to flow from the bore 40 into the cavity 66. A permanent magnet 74 is carried within the piston adjacent the left-hand end of the cavity 66 and is held in place by a retainer 76. The magnet 74 serves to magnetically attract a steel ball 78 disposed within the cavity 66 and hold the ball against a circular edge 80 at the left-hand end of the cavity 66. The right-hand end of the cavity 66 is closed by a lock or disk-shaped member 82 having a through opening 84 and held in place by a lock ring 86. The plug 82 is provided with a resilient valve seat member 88 having an opening adapted to be closed by the ball 78 for the purpose of preventing the passage of fluid through the opening 84. Thus, when the ball 78 is seated against the valve seat member 88, fluid communication between the inlet and outlet openings 36 and 38 is sealed off.

During normal light braking, the piston 56 is located within the bore in the position illustrated in FIGURE 1 by a heavy pre-compressed spring 90 and a light-weight return spring 92. The spring 90 is seated at one end against an annular shim 94 engaging a shoulder 95 on the end closure member 32. The opposite end of the spring 90 engages one side of a washer 96 seated against the housing shoulder 44. The washer 96 extends radially inwardly of the wall of the bore portion 46 and is engaged on its opposite side by a shoulder 99 on the left-hand end of the piston 56. The piston is normally held against the washer 96 by the light-weight return spring 92 which, in and of itself, is of insufficient strength to overcome the spring 90.

In use, the device 10 is mounted on the vehicle with the outlet 38 pointed toward the front of the vehicle and with the axis of the bore 40 arranged in a horizontal attitude. During normal operation of the brakes and when the vehicle is not decelerated in excess of a predetermined amount (controlled by the strength of the magnet 74) a fluid path for the transmission of braking pressure is provided from the inlet opening 36 into the bore 40 through the openings 72 and 84 to the outlet opening 38. Under such conditions, the proportioning device has no effect upon the braking pressure delivered from the master cylinder to the rear wheel cylinders. During braking, however, fluid pressure within the bore 40 acts upon the piston 56, tending to move the piston 56 in a left-hand direction against the spring 90. This action is produced by the fact that the shoulders and surface areas of the piston exposed to fluid pressure which face in a right-hand direction are greater in area than such surfaces and shoulders which face in a left-hand direction. The spring 90 is pre-compressed and when the force tending to move the piston in a left-hand direction becomes sufficient to overcome the spring 90, the washer 96 will be moved off the shoulder 99 and the spring 90 will be further compressed. The spring 90 is preferably a variable rate spring, so that the force exerted by the spring 90 on the piston will become greater the more the spring is compressed. For the purpose of preventing excessive left-hand movement of the piston 56, a stud 100 is threaded through the end cover member 32 and held in place by a nut 102, so that the left-hand end 103 of the piston 56 will engage the end of the stud to limit its travel when such travel becomes excessive. The bore portion 42 within which the spring 90 is located is vented to atmosphere by vent openings 104 and, thus, there is no fluid pressure acting upon the left-hand end of the piston. Similarly, the left-hand end of the cavity 66 is vented to the bore 40 by vent openings 105, to permit reseating of the ball 78 on the circular edge 80 and to provide for substantially equal pressure on all sides of the ball 78.

As the vehicle is decelerated, the ball 78 serves as an inertia mass and attempts to continue its forward motion. When the deceleration becomes great enough, the inertia of the ball 78 will overcome the attraction of the magnet 74 and the ball 78 will move off of the circular edge 80 and seat on the valve seat member 88 to close the opening 84. In moving away from the edge 80 and the magnet 74, the ball 78 becomes less influenced by the magnetic field of the magnet 74 and, thus, the device has what might be termed an "over center" action. Additionally, the pressure of the brake fluid within the cavity 66 tends to keep the ball 78 seated. After closure of the opening 84, fluid pressure at the inlet 36 is sealed off from fluid pressure at the outlet 38. Thus, further pressurization of the fluid in the rear wheel brake cylinders can only be accomplished by movement of the piston 56 in a right-hand direction. Pressure for producing such right-hand movement is produced by the force of the spring 90, together with the force of the brake fluid in the bore 40 acting upon an area of the piston 56 which is equal to the area of the bore portion 54, less the area of the bore portion 46. This force is sufficient to continue the application of braking pressure to the rear wheels but in a lesser proportion than the braking pressure delivered to the front wheels. As the spring 90 pays out, its contribution will become less and, thus, the force with which the piston 56 pressurizes the fluid in the rear wheel brake cylinders is reduced.

During normal use, the travel of the piston 56 is very slight and it is intended that the brakes will have been released prior to the time that the washer 96 becomes reseated against the shoulder 99. The only time that the piston 56 might over travel either prior to the closure of the ball 78 or afterwards is under conditions of brake fade, when a low coefficient of friction condition exists between the linings of the brake shoes and the brake drums. If the piston 56 were permitted to compress indefinitely under such conditions, an excessive quantity of brake fluid might be used, which could result in the brake pedal 14 being compressed in the floorboards of the automobile during the course of braking. The stud 100 prevents this possibility and assures that only a minimum quantity of brake fluid will be utilized to compress the spring 60 under any braking conditions. In the event of over travel of the piston 56 in a right-hand direction, the fluid pressure within the bore 40 acting upon the piston 56 over an effective area equal to the diameter of the bore portion 54 minus the diameter of the bore portion 46 will still attempt to move the piston 56 in a right-hand direction, although with a substantially reduced force. After the release of pressure from the brake pedal, the forces on all sides of the ball 78 will become equalized and the magnetic force of the magnet 74 will reseat the ball 78 against the circular edge 80. The return spring 92, which is seated against a shoulder 98 on the end closure member 34, will then return the piston to the position illustrated in the drawings.

Figure 2:
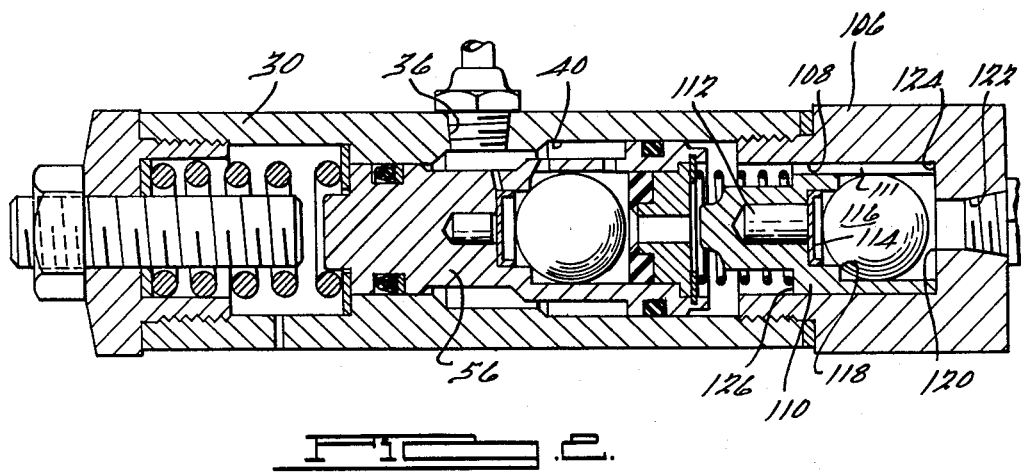
FIG. 2 is an axial sectional view of another form of the proportioning device.

FIG. 2 illustrates a modified form of the invention which utilizes the same housing 30 having a bore 40, inlet opening 36 and a piston 56. However, the end closure member 34 is replaced by an end closure member 106 having a bore 108 which is open to the housing bore 40 and in which a cage 110 is positioned. The cage 110 has axially extending peripheral slots 111 which permit the flow of fluid thereby. The cage 110 also carries a permanent magnet 112 held in place by a retainer 114 to magnetically attract a steel ball 116 carried within the cage and to normally hold the ball 116 against a circular edge 118 of the cage. The permanent magnet 112 is of greater strength than the magnet carried by the piston 56 and, thus, the ball 116 will not move off of the edge 118 until a greater degree of deceleration is attained. When this greater deceleration is reached, however, the ball 116 will seat against a valve seat 120 to prevent further passage of fluid through an outlet opening 122.

The entire device is intended to be connected in a fluid brake system in a similar manner to the device illustrated in FIGURE 1, with the opening 122 being directly connected to the rear wheel brake cylinders and with the inlet opening 36 being connected to the conduit supplying fluid to the front wheel brake cylinders. It will be apparent that, when the ball 116 closes, further application of braking pressure to the rear wheel brakes is completely shut off. The magnet 112 is desirably of such strength that the ball 116 will close when skidding is normally encountered.

Figure 3:
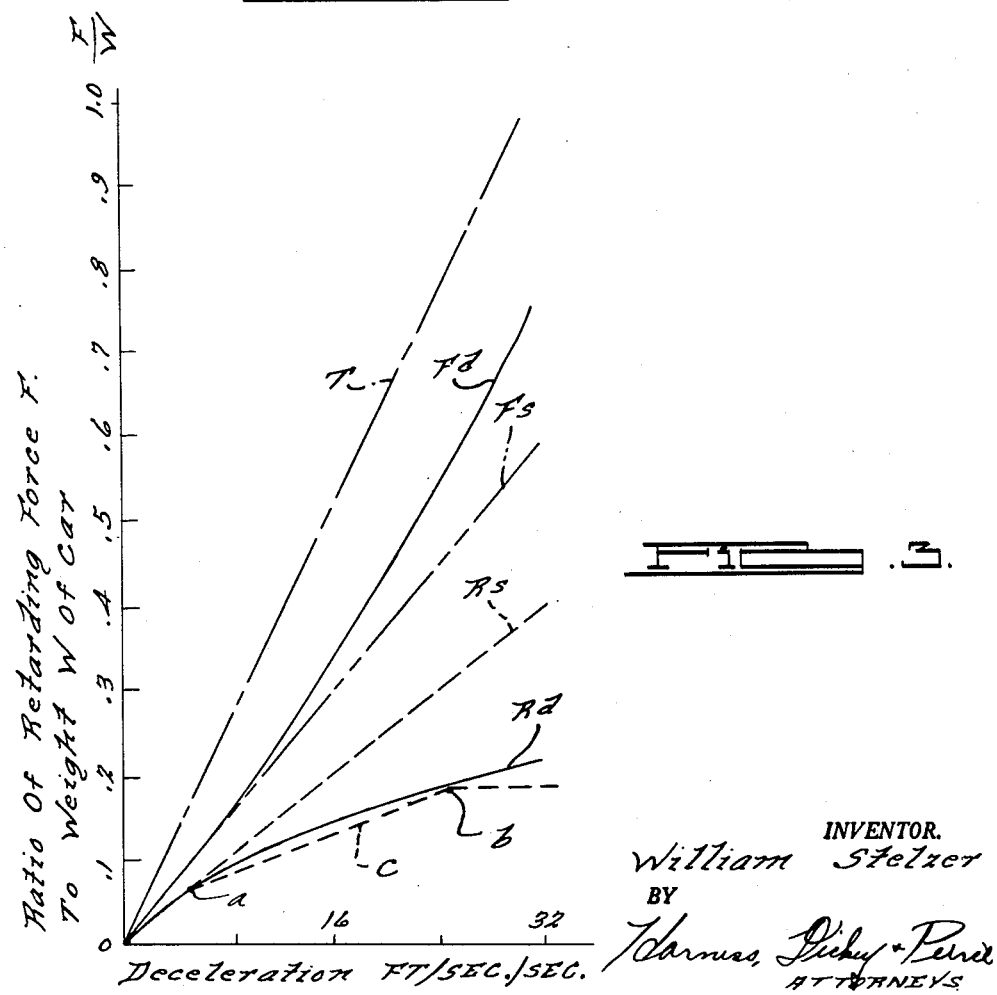
FIG. 3 is a graph showing actual and ideal braking efforts as a function of deceleration.

FIG. 3 is a graphic representation of the distribution of braking force for a given vehicle during deceleration. Line T represents the total braking effort or retarding force of both front and rear brakes. Lines Fs and Rs represent the relative retarding effort of the front and rear brakes in the absence of the proportioning device of the present invention. This proportion is normally controlled by the relative piston sizes, as suggested by the static weight distribution of the vehicle. Lines Fd and Rd represent the ideal relative retarding forces of the front and rear brakes during deceleration for producing maximum braking effort without premature skidding of one set of wheels. Lines Fd and Rd correspond to the transfer of weight from rear to front wheels during deceleration. It will be noted that the proportion of the retarding force of the rear brakes to the front brakes is reduced as deceleration is increased. Line C indicates the results produced by the use of the control device of the present invention. Point a on line C indicates the point at which the ball 78 closes. In the use of the device of FIGURE 1, this line will continue as a somewhat downwardly curving line until the washer 96 reseats against the shoulder 44. However, the addition of the second ball, as illustrated in FIG. 2, will produce a change at point b, to thereafter limit the application of any additional braking force to the rear brakes.

From the foregoing, it will be seen that line C very closely approximates the ideal distribution of braking force to the rear wheel brakes. In devices heretofore produced, marked deviations from the ideal curve have been encountered, particularly at the moment that the inertia member comes into operation. However, the spring 90 of the present proportioning device is effective to continue the smooth and gradual increased application of braking pressure to the rear brakes.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A brake pressure control device for use in a vehicle hydraulic brake system including a housing having a fluid inlet adapted to receive fluid from a source of fluid pressure, a fluid outlet through which fluid is adapted to be displaced to a brake cylinder and a fluid chamber providing communication between said inlet and outlet, differential area means in said chamber sealingly engaging the walls thereof, opening means in said piston providing fluid communication from the inlet side to the outlet side of said fluid displacing means, deceleration responsive means for closing said opening means and changing the areas of said fluid displacing means exposed to inlet fluid pressure, and resilient means adapted to be loaded by movement of said fluid displacing means under the influence of inlet fluid pressure when said opening means is open and to exert a force on said fluid displacing means assisting displacement of fluid through said outlet after closure of said opening means.

2. A brake pressure control device for use in a vehicle hydraulic brake system including a housing having a fluid inlet adapted to receive fluid under pressure, a fluid outlet through which fluid is adapted to be displaced to a brake cylinder and a bore providing communication between said inlet and outlet, a differential area piston in said bore sealingly engaging the wall thereof between said inlet and said outlet, said piston having an opening therein, an inertia member for closing said opening upon the attainment of a predetermined rate of deceleration and changing the ratios of the areas of said piston exposed to inlet and outlet fluid pressure, and a spring adapted to be loaded by movement of said piston under the influence of inlet fluid pressure when said opening is open and arranged to exert a force on said piston urging said piston in a direction displacing fluid through said outlet after closure of said opening.

3. A brake pressure control device for use in a vehicle hydraulic brake system including a housing having a fluid inlet adapted to receive fluid under pressure, a fluid outlet through which fluid is adapted to be displaced to a brake cylinder and a bore providing communication between said inlet and outlet, a differential area piston in said bore having means sealing engaging the wall thereof between said inlet and outlet, means providing an opening in said piston for fluid communication between portions of said bore on opposite sides of said piston sealing means, a deceleration responsive member for closing said opening, said piston being movable in a direction away from said outlet under the influence of inlet fluid pressure when said opening is open and said piston being movable in a direction toward said outlet opening under the influence of inlet fluid pressure when said opening is closed, a spring adapted to be loaded by movement of said piston away from said inlet opening and arranged to exert a force on said piston assisting movement of said piston toward said outlet opening after closure of said opening.

4. A brake pressure control device for use in a vehicle hydraulic brake system including a housing having a bore, an inlet open to said bore and an outlet communicating with said bore in a location spaced from said inlet, a differential area piston in said bore having a first portion sealingly engaging the wall of said bore between said inlet and outlet and a second portion sealingly engaging the wall of said bore on the side of said inlet opposite from said outlet, opening means in said piston providing fluid communication between the portions of said bore on opposite sides of said first piston portion, a deceleration responsive member for closing said opening means, and a spring adapted to be loaded by movement of said piston under the influence of inlet fluid pressure when said opening is open and arranged to exert a force on said piston assisting displacement of fluid from said outlet after closure of said opening.

5. A brake pressure control device for use in a vehicle hydraulic brake system including a housing having a bore, an inlet open to a side wall of said bore and an outlet communicating with said bore at one end thereof, a piston in said bore having an enlarged portion sealingly engaging the wall of said bore between said inlet and said outlet and being shaped to provide an opening therearound opposite said inlet, means on said housing sealingly engaging and supporting said piston at the end of said bore opposite said outlet, whereby the end of said piston opposite from said outlet is not subject to inlet fluid pressure, opening means providing fluid communication between portions of said bore on opposite sides of said enlarged piston portion, deceleration responsive means for closing said opening and preventing transmission of inlet fluid pressure to the end of said piston adjacent said outlet and whereby said piston will be displaced in a direction away from said outlet when said opening is open and toward said outlet when said opening is closed, and a spring adapted to be compressed by movement of said piston away from said outlet and arranged to exert a force on said piston assisting displacement of fluid through said outlet after closure of said opening.

6. A brake pressure control device for use in a vehicle hydraulic brake system including a housing having a fluid inlet adapted to receive fluid under pressure, a fluid outlet through which fluid is adapted to be displaced to a brake cylinder and a bore providing communication between said inlet and outlet, a differential area piston in said bore sealingly engaging the wall thereof between said inlet and said outlet, said piston having an opening therein, an inertia member for closing said opening upon the attainment of a predetermined rate of deceleration and changing the ratios of the areas of said piston exposed to inlet and outlet fluid pressure, a first spring adapted to be loaded by movement of said piston under the influence of inlet fluid pressure when said opening is open and arranged to exert a force on said piston urging said piston in a direction displacing fluid through said outlet after closure of said opening, and a return spring of substantially lesser strength than said first spring biasing said piston in opposition to said first spring.

7. A brake pressure control device for use in a vehicle hydraulic brake system including a housing having a fluid inlet adapted to receive fluid under pressure, a fluid outlet through which fluid is adapted to be displaced to a brake cylinder and a bore providing communication between said inlet and outlet, a differential area piston in said bore sealingly engaging the wall thereof between said inlet and said outlet, said piston having an opening therein, a permanent magnet disposed in said piston, an inertia member of magnetic material held in a position spaced from said opening by said magnet, said inertia member being adapted to be moved away from said magnet and seat against said opening upon the attainment of a predetermined rate of deceleration to change the ratios of the areas of said piston exposed to inlet and outlet fluid pressure, and a spring adapted to be loaded by movement of said piston under the influence of inlet fluid pressure when said opening is open and to exert a force on said piston urging said piston in a direction displacing fluid through said outlet after closure of said opening.

8. A brake pressure control device for use in a vehicle hydraulic brake system including a housing having a fluid inlet adapted to receive fluid under pressure, a fluid outlet through which fluid is adapted to be displaced to a brake cylinder and a bore providing communication between said inlet and outlet, a differential area piston in said bore having means sealingly engaging the wall thereof between said inlet and said outlet, opening means in said piston providing fluid communication between portions of said bore on opposite sides of said piston means, a deceleration responsive member for closing said opening upon the attainment of a predetermined rate of deceleration and changing the ratios of the areas of said piston exposed to inlet and outlet fluid pressure, and a pre-compressed spring adapted to be further compressed by said piston under the influence of inlet fluid pressure when said opening is open whereby said spring will exert a force on said piston urging said piston in a direction displacing fluid through said outlet after closure of said opening.

9. A brake pressure control device for use in a vehicle hydraulic brake system including a housing having a fluid inlet adapted to receive fluid under pressure, a fluid outlet through which fluid is adapted to be displaced to a brake cylinder and a bore providing communication between said inlet and outlet, a differential area piston in said bore sealingly engaging the wall thereof between said inlet and said outlet, opening means in said piston providing fluid communication between the portions of said bore on opposite sides of the portion of said piston sealingly engaging said bore wall, a deceleration responsive member for closing said opening upon the attainment of a predetermined rate of deceleration and changing the ratios of the areas of said piston exposed to inlet and outlet fluid pressure, shoulder means in said bore, annular means engageable with said shoulder means and extending radially inwardly therefrom for engagement by said piston, and a spring holding said annular means against said shoulder means, said piston being operable to compress said spring under the influence of inlet fluid pressure when said opening is open whereby said spring will exert a force on said piston assisting said piston in the displacement of fluid from said outlet after closure of said opening.

References Cited in the file of this patent
UNITED STATES PATENTS

| | | |
|---|---|---|
| 2,903,100 | Freeman | Sept. 8, 1959 |
| 2,991,797 | Baldwin | July 11, 1961 |